(12) United States Patent
Liu et al.

(10) Patent No.: US 7,528,996 B2
(45) Date of Patent: May 5, 2009

(54) SCANNING APPARATUS

(75) Inventors: Chun-Liang Liu, Banciao (TW);
Jen-Chieh Liu, Danshuei Township,
Taipei County (TW)

(73) Assignee: Lite-On Technology Corporation,
Taipei (TW)

( * ) Notice: Subject to any disclaimer, the term of this patent is extended or adjusted under 35 U.S.C. 154(b) by 373 days.

(21) Appl. No.: 11/508,213

(22) Filed: Aug. 23, 2006

(65) Prior Publication Data

US 2007/0223066 A1 Sep. 27, 2007

(30) Foreign Application Priority Data

Mar. 24, 2006 (TW) ............................... 95204992 U

(51) Int. Cl.
*H04N 1/40* (2006.01)
*H04N 1/04* (2006.01)

(52) U.S. Cl. .................... 358/461; 358/496; 358/498

(58) Field of Classification Search ............... 358/461, 358/496, 498, 406, 504; 382/274
See application file for complete search history.

(56) References Cited

U.S. PATENT DOCUMENTS 5,537,219 A * 7/1996 Morikawa et al. ............ 358/406

* cited by examiner

*Primary Examiner*—Cheukfan Lee
(74) *Attorney, Agent, or Firm*—Rabin & Berdo, P.C.

(57) ABSTRACT

A scanning apparatus includes a body, a transparent plate, a scanning module, and a color reference slice. A paper-feeding track is formed within the body, and a scanning window is formed at a side wall of the paper-feeding track. A coupling groove is formed at an edge of the scanning window. Both the transparent plate and the color reference slice have an edge being inserted into the coupling groove, such that the transparent plate covers the scanning window while the color reference slice leans against a side surface of the transparent plate facing the paper-feeding track. The scanning module is disposed within the body corresponding to the scanning window, such that a paper to be scanned and the color reference slice are located in the same plane, and the color reference slice and the paper are scanned under the same optical conditions.

7 Claims, 4 Drawing Sheets

SCANNING APPARATUS

CROSS-REFERENCE TO RELATED APPLICATIONS

This non-provisional application claims priority under 35 U.S.C. § 119(a) on Patent Application No(s). 095204992 filed in Taiwan, R.O.C. on Mar. 24, 2006 the entire contents of which are hereby incorporated by reference.

BACKGROUND OF THE INVENTION

1. Field of Utility Model

The present invention relates to a sheetfed scanning apparatus, and more particularly to a structure for mounting a transparent plate and a color reference slice in the sheetfed scanning apparatus.

2. Related Art

The scanning apparatus in a sheetfed scanner or multi-functional-printer (MFP) has a transparent plate made of transparent materials such as glass, and paper sheets moving on the transparent plate are scanned by a scanning module, so as to produce and then output the image data. The transparent plate is mainly used for separating the paper sheets from the scanning module, so as to prevent the paper sheets from contacting the scanning module directly, and to form a smooth plane pervious to light. Thus the paper sheets pass over scanning module evenly, and thereby accurate image data are captured by the scanning module.

Moreover, during scanning, a color reference is required for a control circuit of the scanning apparatus to correct the color and color level of the captured image, such that the captured image data shows the accurate color and color level of the original image. In general, a color reference slice is disposed in the scanning apparatus as a color reference, such that when scanning the paper sheets, the scanning module also captures the image of the color reference slice, and then corrects the image data with the color and color level of the color reference slice as a correction reference.

Referring to FIG. 1, it shows a sheetfed scanning apparatus 100 in the prior art. The sheetfed scanning apparatus 100 includes a cover 110 and a base 120, and a spacing distance exists there-between to form a paper-feeding track 130 for paper sheets to pass therethrough. A scanning window 121 is opened on the base 120, and a transparent plate 140 is firmly fixed at the scanning window 121 by a clamping plate 123 which is fixed by a screw 122 on lower side of the base 120. The transparent plate 140 is clamped and fixed on the lower side of the base 120 where the scanning window 121 is covered thereby. A scanning module 150 is disposed below the base 120 corresponding to the scanning window 121 to scan the paper sheet passing over the transparent plate 140. A color reference slice 160 is disposed at the cover 110 corresponding to the scanning window 121 to provide color reference for the scanning module 150. However, with this method, if the assembly tolerance is relatively large, the spacing distance between the color reference slice 160 and the plane through which the paper sheet passes is changed, and thereby the optical condition is changed, so that the color reference slice 160 for each scanning apparatus 100 shows different color references, resulting in different scanning results for different scanning apparatuses 100.

Referring to FIG. 2, it shows another sheetfed scanning apparatus 200 in the prior art. When fixing a transparent plate 240, a color reference slice 260 is clamped below the transparent plate 240 by a clamping plate 223, such that the distance between the plane through which the paper sheet passes while being scanned and the color reference slice 260 is always equal to the thickness of the transparent plate 240. As long as the thickness tolerance of the transparent plate 240 falls within a predetermined range, the color reference values produced by the color reference slices 260 of different scanning apparatuses 200 tend to be the same. However, the paper sheet and the color reference slice 260 are separated on two sides of the transparent plate 240 in this design, such that the color reference value actually captured by the scanning module 250 is still influenced by the transparent plate 240, and thereby the optical condition of the paper sheet cannot be truly presented, resulting in differences in the scanning results.

Moreover, in the aforementioned designs of FIGS. 1 and 2, the plane through which paper sheet actually passes is different from the plane where the color reference slice 160 or 260 is located, such that the difference between the optical condition of the paper sheet and that of the color reference slice cannot be actually presented. Therefore, repeated tests are required for processing the color reference value of the scanning module 150, 250 obtained by the color reference slice 160, 260 respectively to obtain a modification parameter, which truly acts as the color reference value when the paper sheet is scanned. Also, additional elements are required for fixing the color reference slice and the transparent plate, thus, the assembly is quite inconvenient.

SUMMARY OF THE INVENTION

The structure of fixing the color reference slice for the sheetfed scanning apparatus in the prior art results in that the color reference slice cannot truly reveal the optical condition of the paper sheet to be scanned. In view of the aforementioned problems, the object of the invention is to provide a scanning apparatus, wherein the difference between the optical condition of the paper sheet and that of the color reference slice is accurately revealed, such that the color reference value of the scanning module obtained by the color reference slice can be directly used to correct the scanning result of the paper sheet to be scanned.

In order to achieve the above object, a scanning apparatus of the invention is provided, which includes a body, a transparent plate, a scanning module, and a color reference slice. The body has a cover and a base, and a spacing distance exists there-between to form a paper-feeding track within the body. A scanning window is formed at a side wall of the paper-feeding track. A coupling groove is formed at one edge of the scanning window, and a supporting portion is correspondingly formed at the other opposite edge. One edge of the transparent plate is inserted into the coupling groove, while the other edge leans against the supporting portion, such that the transparent plate is disposed at the scanning window and covers thereon. The scanning module is disposed in the base corresponding to the scanning window, such that the transparent plate is located between the scanning module and the paper-feeding track. The color reference slice leans against one side surface of the transparent plate facing the paper-feeding track, and an edge of the color reference slice is inserted into the coupling groove together with the edge of the transparent plate, so that the color reference slice is fixed at the side surface of the transparent plate facing the paper-feeding track. Thus, when a paper sheet to be scanned is fed via the paper-feeding track to pass over the side surface of the transparent plate to be scanned by the scanning module, the color reference slice is located on the same plane as the paper sheet passing through, such that the color reference slice can accurately reveal the optical condition of the paper sheet, thus, the color reference value of the scanning module obtained by the color reference slice is directly used to correct the image data of the paper sheet captured by scanning the paper.

The advantage of the invention is that the color reference slice directly leans against a side surface of the transparent plate facing the paper-feeding track, and is located on the same plane as the paper sheet passing through, such that the color reference value used for correcting the color is not distorted but truly reveals the optical condition of the paper sheet to be scanned. Meanwhile, no additional elements or tools are required for fixing the transparent plate and the color reference slice in the scanning apparatus, so as to effectively simplify the overall assembly process.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given herein below for illustration only, and thus is not limitative of the invention, and wherein.

DETAILED DESCRIPTION OF THE INVENTION

To further understand the objects, constructions, features, and functions of the invention, the detailed description is now given below through the embodiments.

Figure 1:
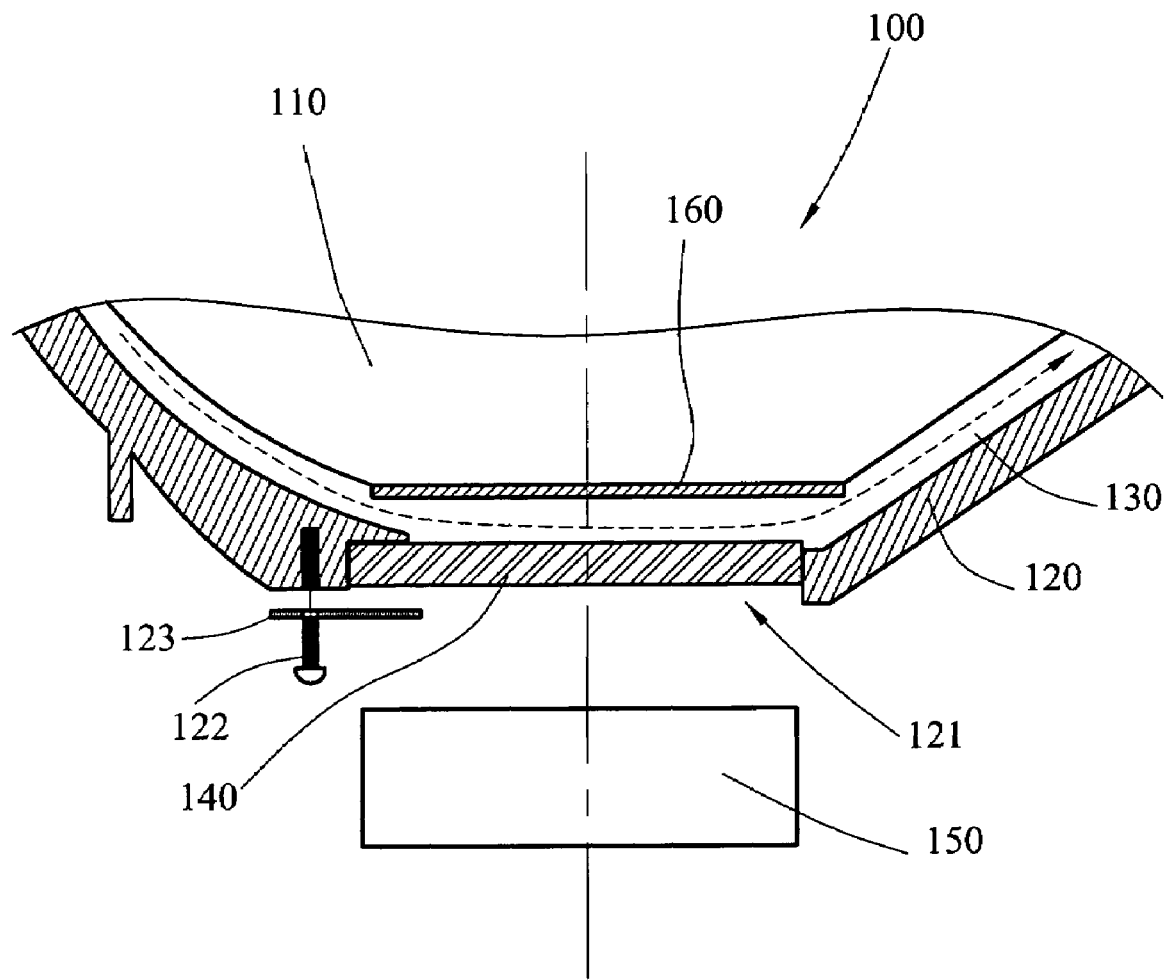
FIG. 1 is a sectional view of a sheetfed scanning apparatus in the prior art.
Figure 2:
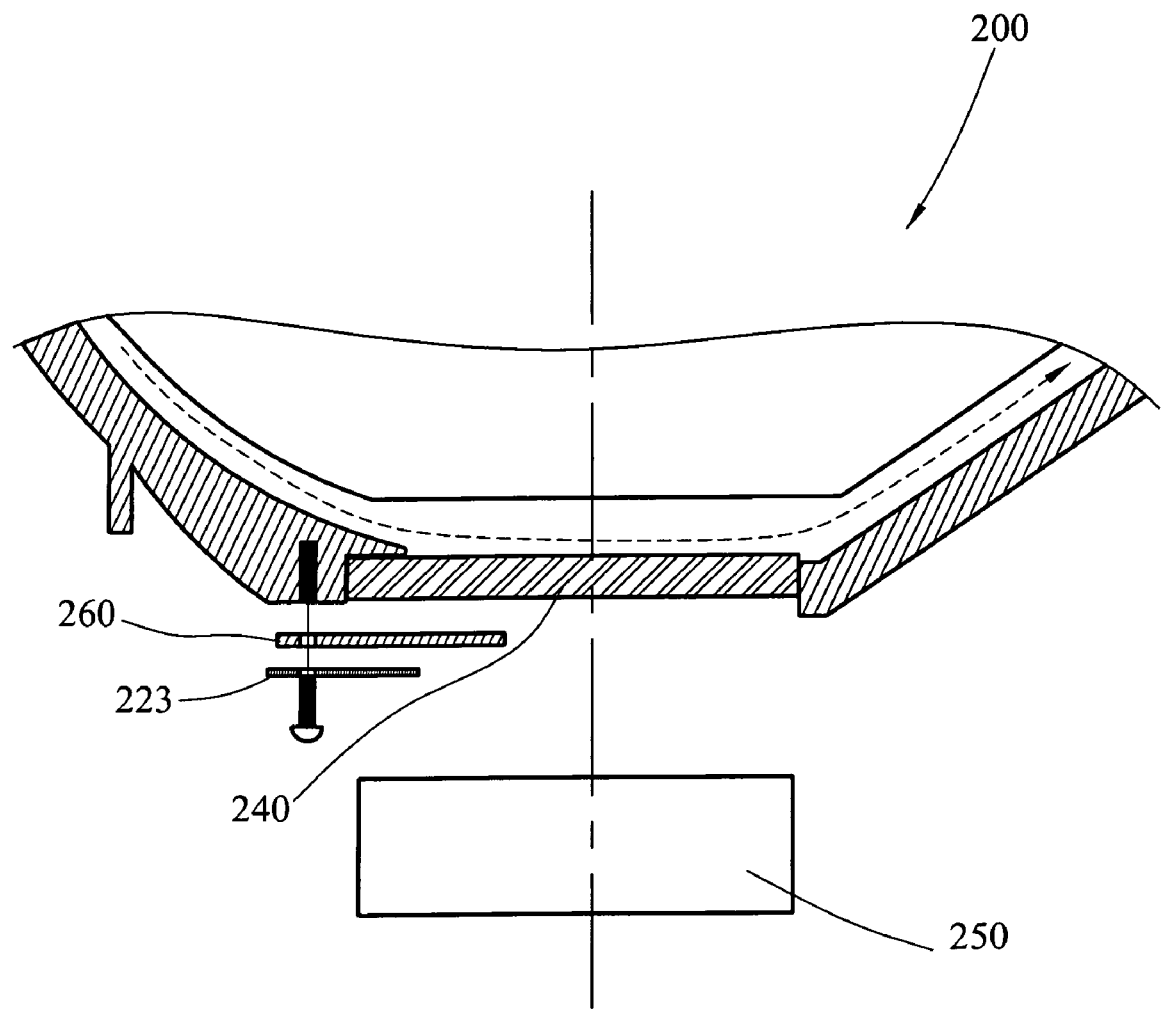
FIG. 2 is a sectional view of another sheetfed scanning apparatus in the prior art.
Figure 3:
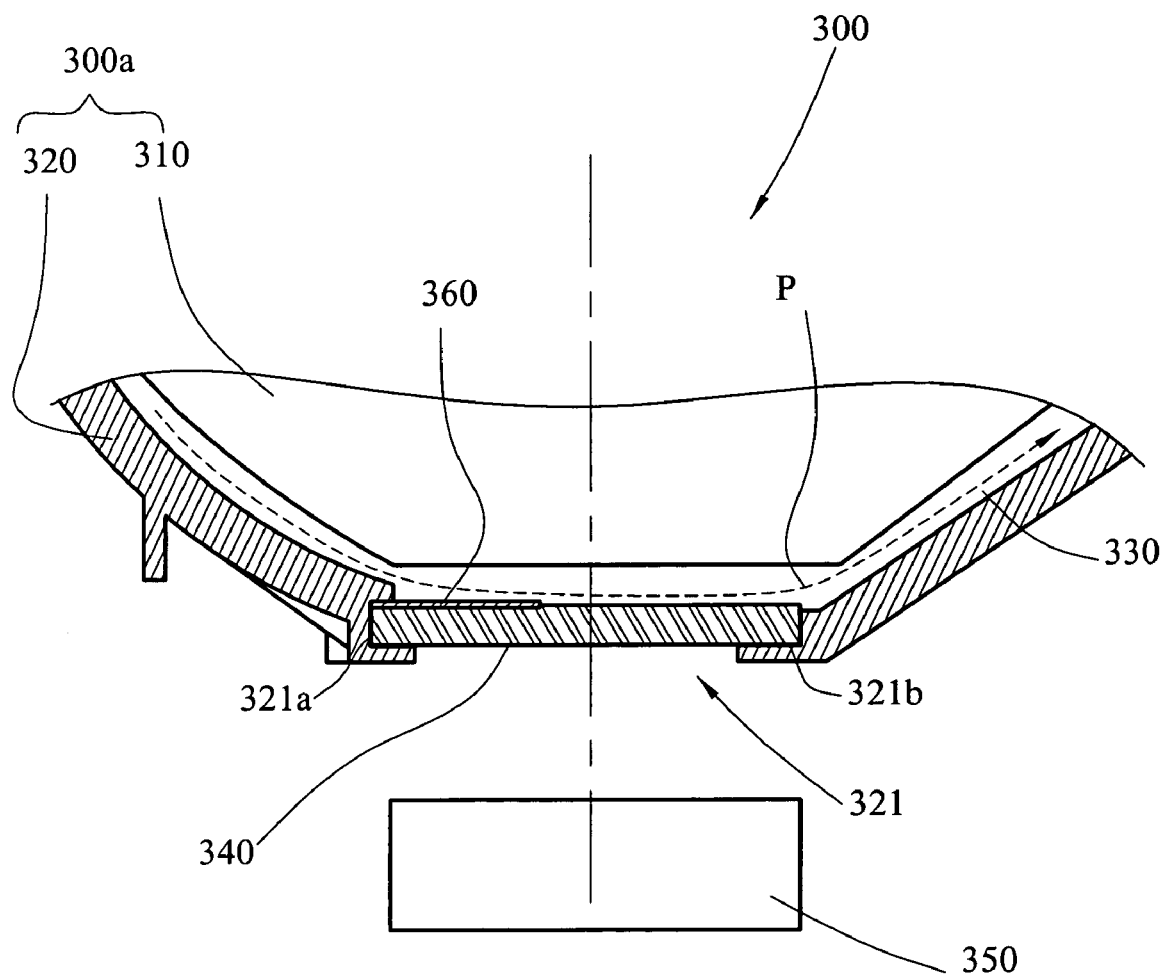
FIG. 3 is a sectional view of scanning apparatus according to an embodiment of the invention.
Figure 4:
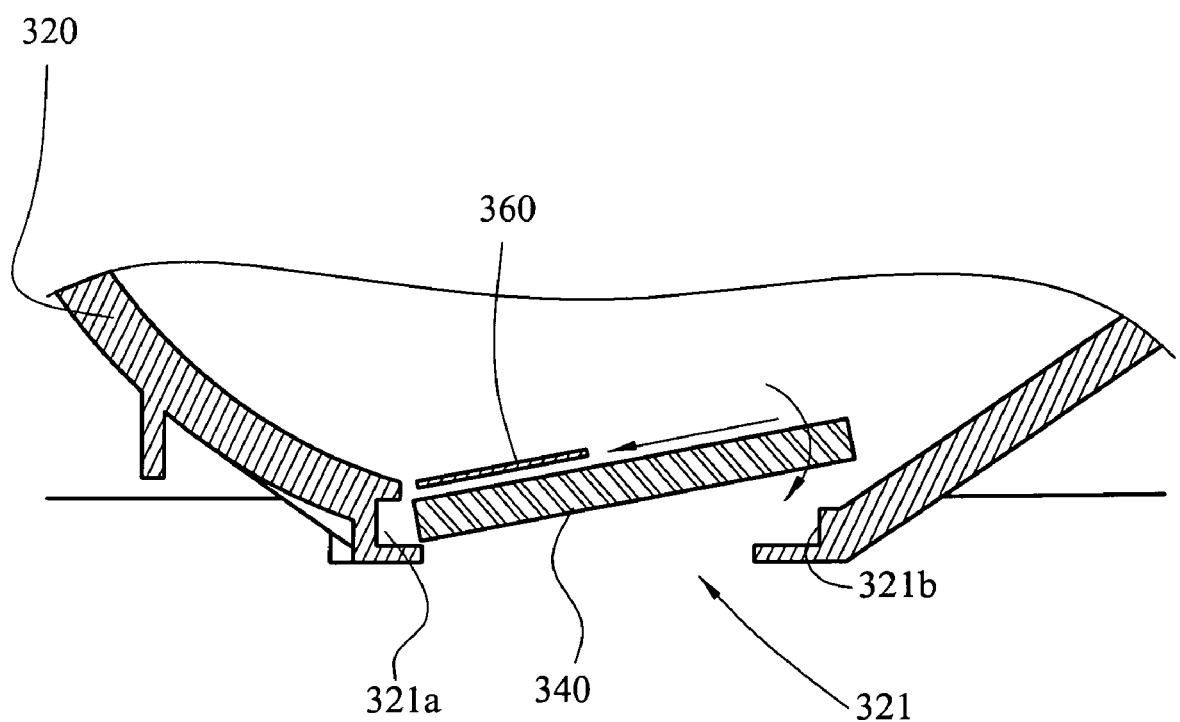
FIG. 4 is a enlarged sectional view of the scanning apparatus of the embodiment of the invention.

Referring to FIGS. 3 and 4, a scanning apparatus 300 of an embodiment of the invention is provided, which is either an independent sheetfed scanner or a part of a multi-functional-printer (MFP). The scanning apparatus 300 includes a body 300a, a transparent plate 340, a scanning module 350, and a color reference slice 360.

The body 300a includes a cover 310 and a base 320. The bottom surface of the cover 310 is convex-shaped and the top surface of the base 320 is concave-shaped, such that the cover 310 and the base 320 are matched with each other. The cover 310 is disposed above the base 320 and a spacing distance exists there-between to form a paper-feeding track 330 within the body 300a for a paper sheet P to move there-through. Moreover, a scanning window 321 is formed on the base 320, corresponding to a side wall of the paper-feeding track 330. A coupling groove 321a is formed at an edge of the scanning window 321, and a supporting portion 321b is formed at the other opposite edge. The supporting portion 321b is extended from the edge of the scanning window 321, and its thickness is less than that of the other parts at the periphery of the base 320 situated at the scanning window 321, so as to form a stair-shaped structure.

The transparent plate 340 is made of optically transparent materials such as acryl or glass, one edge of which is inserted into the coupling groove 321a and the other edge leans against the supporting portion 321b, such that the transparent plate 340 is disposed at the scanning window 321 and covers it. When moving in the paper-feeding track 330, the paper sheet P passes over the scanning window 321 and leans against a side surface of the transparent plate 340 facing the paper-feeding track 330 with its side surface to be scanned and then moves on forwards.

The scanning module 350 is disposed below the base 320 corresponding to the scanning window 321, such that the transparent plate 340 is located between the scanning module 350 and paper-feeding track 330. The scanning module 350 emits a scanning light towards the scanning window 321, which passes through the transparent plate 340 and projects onto the paper sheet P to be scanned passing through the side surface of the transparent plate 340 facing the paper-feeding track 330, such that a reflective light is produced to return to the scanning module 350.

The color reference slice 360 leans against the side surface of the transparent plate 340 facing the paper-feeding track 330, wherein the color reference slice 360 leans against the side surface of the transparent plate 340 away from the scanning module 350, and an edge of the color reference slice 360 is inserted in the coupling groove 321a, together with the edge of the transparent plate 340, such that the color reference slice 360 and the transparent plate 340 are both disposed at the scanning window 321. The color reference slice 360 is generally white. After the image data of the color reference slice 360 is captured by the scanning module 350, such an image data is used as a color reference value for correcting the following scanning result of the paper sheet. Since the color reference slice 360 is located on the side surface of the transparent plate 340 facing the paper-feeding track 330, when the paper sheet P to be scanned is fed to the transparent plate 340 via the paper-feeding track 330 for being scanned by the scanning module 350, the color reference slice 360 is located on the same plane as the paper sheet P. Thus, either the distance passed by the scanning light projecting to the color reference slice 360 and paper sheet P or the medium passed through by the scanning light are the same, and either the distance passed by the reflective light returning from the color reference slice 360 and paper sheet P to the scanning module 350 or the medium passed through by the reflective light are the same, such that the optical conditions for the color reference slice 360 and paper sheet P to be scanned are the same. Therefore, the color reference value of the scanning module 350 obtained by the color reference slice 360 can be directly used to correct the image data captured by scanning the paper sheet P. Additional tests are not required to obtain a parameter to modify the correction result, and the position change of the color reference slice 360 caused by the assembly tolerance is avoided; thereby the correcting result is not affected.

Again referring to FIG. 4, when the transparent plate 340 and color reference slice 360 of the invention are assembled, the transparent plate 340 and the color reference slice 360 are overlapped with each other, and meanwhile one edge of each of them is aligned with each other. Then, the transparent plate 340 and the color reference slice 360 are slantingly inserted into the coupling groove 321a of the scanning window 321 with the aligned lateral edges, and then, the other opposite edge of the transparent plate 340 is moved towards the supporting portion 321b, such that the transparent plate 340 is inserted in the coupling groove 321a together with the color reference slice 360, thus, the transparent plate 340 is disposed at the scanning window 321 and the color reference slice 360 is disposed on the side surface of the transparent plate 340 facing the paper-feeding track 330. Therefore, no additional elements and tools are required for mounting and detaching the transparent plate 340 and the color reference slice 360, such that the overall assembly process is effectively simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scanning apparatus, comprising:
   a body, having a paper-feeding track formed within the body and a scanning window formed at a side wall of the paper-feeding track, wherein a coupling groove is formed at an edge of the scanning window, and a supporting portion is correspondingly formed at the opposite edge thereof;
   a transparent plate disposed at the scanning window, wherein an edge of the transparent plate is inserted into the coupling groove and the other edge of the transparent plate leans against the supporting portion;
   a scanning module disposed below the body corresponding to the scanning window, wherein the transparent plate is located between the scanning module and the paper-feeding track; and
   a color reference slice with an edge being inserted into the coupling groove, wherein the color reference slice leans against one side surface of the transparent plate facing the paper-feeding track.

2. The scanning apparatus as claimed in claim 1, wherein the body includes a base and a cover, and a spacing distance exists there-between to form the paper-feeding track.

3. The scanning apparatus as claimed in claim 2, wherein the scanning window is formed on the base.

4. The scanning apparatus as claimed in claim 1, wherein the supporting portion is stair-shaped.

5. A base of a scanning apparatus, wherein a scanning module is disposed below the base, comprising:
   a scanning window, formed on the base corresponding to the scanning module, a coupling groove being formed at an edge of the scanning window;
   a transparent plate, disposed at the scanning window and covering the scanning window; and
   a color reference slice, disposed at a side surface of the transparent plate away from the scanning module, an edge of the transparent plate and an edge of the color reference slice both being inserted into the coupling groove.

6. The base of a scanning apparatus as claimed in claim 5, wherein a supporting portion is formed at the other edge of the scanning window opposite to the coupling groove, and the other edge of the transparent plate leans against the supporting portion.

7. The base of a scanning apparatus as claimed in claim 5, wherein the supporting portion is stair-shaped.

* * * * *